(12) United States Patent
Brunet et al.

(10) Patent No.: US 6,799,452 B2
(45) Date of Patent: Oct. 5, 2004

(54) DEVICE FOR TESTING SEALED INTEGRITY OF A CHAMBER

(75) Inventors: Jean-Claude Brunet, Gex (FR); Max Duret, Gex (FR); André Jacquemod, Sergy (FR)

(73) Assignee: Organisation Europeene pour la Recherche Nucleaire, Geneva (CH)

( * ) Notice: Subject to any disclaimer, the term of this patent is extended or adjusted under 35 U.S.C. 154(b) by 0 days.

(21) Appl. No.: 10/149,305

(22) PCT Filed: Dec. 12, 2000

(86) PCT No.: PCT/FR00/03481

§ 371 (c)(1),
(2), (4) Date: Aug. 29, 2002

(87) PCT Pub. No.: WO01/44773

PCT Pub. Date: Jun. 21, 2001

(65) Prior Publication Data

US 2003/0037598 A1 Feb. 27, 2003

(30) Foreign Application Priority Data

Dec. 15, 1999 (FR) .............................. 99 15814

(51) Int. Cl.⁷ .................................................. G01M 3/02
(52) U.S. Cl. ............................ 73/49.8; 73/49.1; 73/40
(58) Field of Search ....................... 73/49.8, 40, 49.1, 73/40.5 R, 49.5, 46

(56) References Cited

U.S. PATENT DOCUMENTS

| | | | | |
|---|---|---|---|---|
| 1,467,813 A | * | 9/1923 | Rahm .......................... 73/49.8 |
| 2,255,921 A | * | 9/1941 | Fear ................................ 73/46 |
| 2,571,236 A | * | 10/1951 | Hamilton ........................ 73/46 |
| 2,766,614 A | | 10/1956 | Cook |
| 3,233,907 A | * | 2/1966 | Stanton ....................... 277/616 |
| 3,672,403 A | * | 6/1972 | Wilson et al. ................ 138/89 |
| 4,123,095 A | * | 10/1978 | Stehlin ........................ 285/409 |
| 4,185,492 A | * | 1/1980 | Hauk et al. ..................... 73/46 |
| 4,351,446 A | * | 9/1982 | Madden ...................... 220/210 |
| 4,568,115 A | * | 2/1986 | Zimmerly .................... 285/411 |
| 4,727,749 A | | 3/1988 | Miller et al. |
| 5,255,559 A | * | 10/1993 | Jansch ........................... 73/46 |
| 5,448,907 A | * | 9/1995 | Jensen et al. .................. 73/38 |

FOREIGN PATENT DOCUMENTS

GB 2143001 A * 1/1985

OTHER PUBLICATIONS

International Search Report Publication PCT/FR 00/03481; Report dated Nov. 6, 2001.
International Report FR 9915814; Report dated Jul. 18, 2000.

* cited by examiner

Primary Examiner—Michael Cygan
(74) Attorney, Agent, or Firm—Marshall, Gerstein & Borun LLP

(57) ABSTRACT

The invention concerns a device (1) for testing the sealed integrity of a chamber (2), in the form of a particular clamp capable of being opened, in functional position, to sealingly enclose all or part of the chamber (2) to define therearound a vacuum release chamber (3). It comprises: a rigid support frame (5) in several sections (10a, 10b) mutually articulated ($11_1$, $11_2$) for fixing or removing the clamp on the chamber. said frame being like a U-shaped drip channel open radially inwards, and a jacket (6) made of a relatively flexible material supported by the frame (5) and shaped, at the edges of the drip channel, like deformable sealing lips (16) tightly pressed on the chamber surface.

20 Claims, 1 Drawing Sheet

DEVICE FOR TESTING SEALED INTEGRITY OF A CHAMBER

Figure 1:
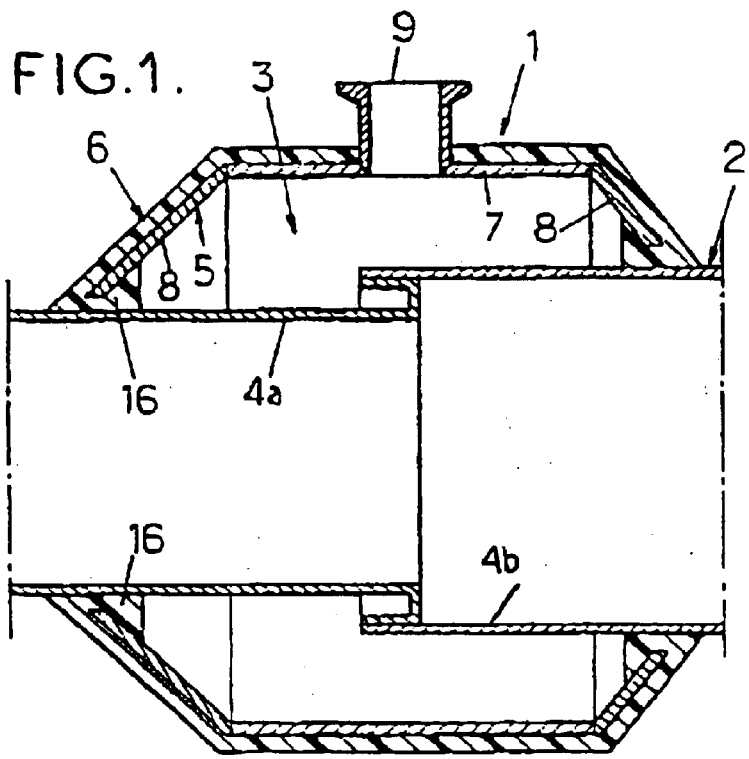

The present invention relates, in general, to the field of devices for leak testing the chamber.

Leak tests are generally carried out using leak detectors operating either by direct pumping or by sniffing.

The test is easy to carry out when the issue is one of checking the tightness of a closed chamber or when it relates to small-sized parts.

However, problems arise when the tightness of a component with a circular weld performed on a very long tube has to be tested and when, in addition, the environment is configured in such a way as to limit accessibility. Access to the interior of the tube is then impossible to have, and it is necessary to envision a test by sniffing from the outside, but the limit on sensitivity of this technique is of the order of $10^{-7}$ [mbar.l.s$^{-1}$] and entails taking extreme precautions in carrying it out.

Document U.S. Pat. No. 2,766,614 discloses a device for leak testing a chamber, configured as an openable clamp capable, in the functional position, of sealingly enclosing all or part of the chamber so as to define, around the latter, a sniffing enclosure.

However, although in its functional principle, such a device is able to give satisfaction, its embodiment, as proposed in that document, is in the form of a flexible strip that can be wound into a clamp with its ends being sealingly locked around the chamber using straps: such an embodiment does not give rise to conditions suitable for obtaining sensitivity greater than those known hitherto through other means, and its practical embodiment is delicate and does not seem able to allow intensive use under industrial conditions.

The object of the invention is to propose a leak test device which, adopting the same basic design, is far more robust from the mechanical point of view, yields tightness conditions of greater quality and leads to appreciably improved sensitivity, while at the same time being able to meet the requirements of intensive industrial use.

To these ends, the invention proposes a device for leak testing a chamber, which device is shaped as an openable clamp capable, in the functional position, of sealingly enclosing all or part of the chamber so as to define, around the latter, a sniffing enclosure, which device, being arranged according to the invention, is characterized in that it comprises a rigid bearing framework made up of several sections articulated together to allow the clamp to be opened up while it is being placed on the chamber or removed therefrom, said framework being shaped in the form of a trough with, in cross section, the overall shape of a U open radially toward the inside, and a jacket made of relatively flexible material, supported by said framework and shaped, at the edges of the trough formed by the framework, into deformable sealing lips able to press sealingly against the surface of the chamber.

Advantageously, the rigid bearing framework is made of metal, particularly of aluminum alloy.

In one practical exemplary embodiment, the rigid bearing framework consists of four sections connected one after the other by three articulations which are offset by about 90° from each other.

In the course of testing, the pumping within the chamber plays a part in pressing the framework around the chamber and therefore in holding the device in a functional position around the chamber; however, it is preferable to provide locking means for holding the clamp in the sealed closed position around the chamber that is to be tested, even if only to hold the device in place before the pumping means are started up.

In order for the sealing lips to have the relative flexibility they need to press sealingly against the chamber while at the same time maintaining the necessary relative hardness to prevent excess fatigue and prevent ultimate rupture of these lips if a very strong vacuum is pulled, the relatively flexible material of which the jacket is made needs to have a shore hardness of about 40.

In one practical exemplary embodiment which is advantageous on account of its simplicity of production and the ease with which it affords sealing in spite of the presence of the articulation, the jacket consists of a plastic material which externally overmolds the rigid framework.

Likewise, in order to be sure of obtaining a sufficiently good seal even in the presence of a very strong vacuum, provision is made for the sealing lips to project beyond the respective edges of the rigid trough and to be widened so as to define a relatively broad face for bearing on the surface of the chamber.

The device according to the invention as has just been described makes it possible to detect leaks at the limit of sensitivity of the detector (of the order of $10^{-9}$ or $10^{-10}$ [mbar.l.s$^{-1}$]). This remarkable performance is due in particular to the self-sealing property afforded by adhesion of the flexible lips of the sealing jacket to the chamber (for example to the periphery of the tube) in proportion to the strength of the vacuum created by pumping, this being true regardless of the surface faults of the chamber.

Because of its one-piece and rigid structure, this device is the only part that has to be handled and, furthermore, it can be handled by just one operator; it can be fitted quickly because of its ease of opening and because it can be opened far wider than the size of the chamber, particularly in the diameter of a tube, and this ease of opening allied with its compactness makes it easy to install in areas which are difficult to access (jumble of tubes, installations frequently modified, etc.).

No seal is attached: there is therefore no risk of trapping a seal which, here again, simplifies the conditions of fitting and functionally operating the device.

The small volume of the chamber means that it can be evacuated quickly and the leakage rate can be measured almost immediately.

In addition, the very architecture of the device allows it to be mounted on chambers of highly diverse shape, and in particular, on tubes regardless of their length and regardless of their diameter, including in the case where the device is mounted straddling a connection between tubes of different diameters.

Ultimately, the intervention time for performing the leak test is appreciably reduced and the results obtained are more reliable than in a conventional sniffing method.

Figure 2:
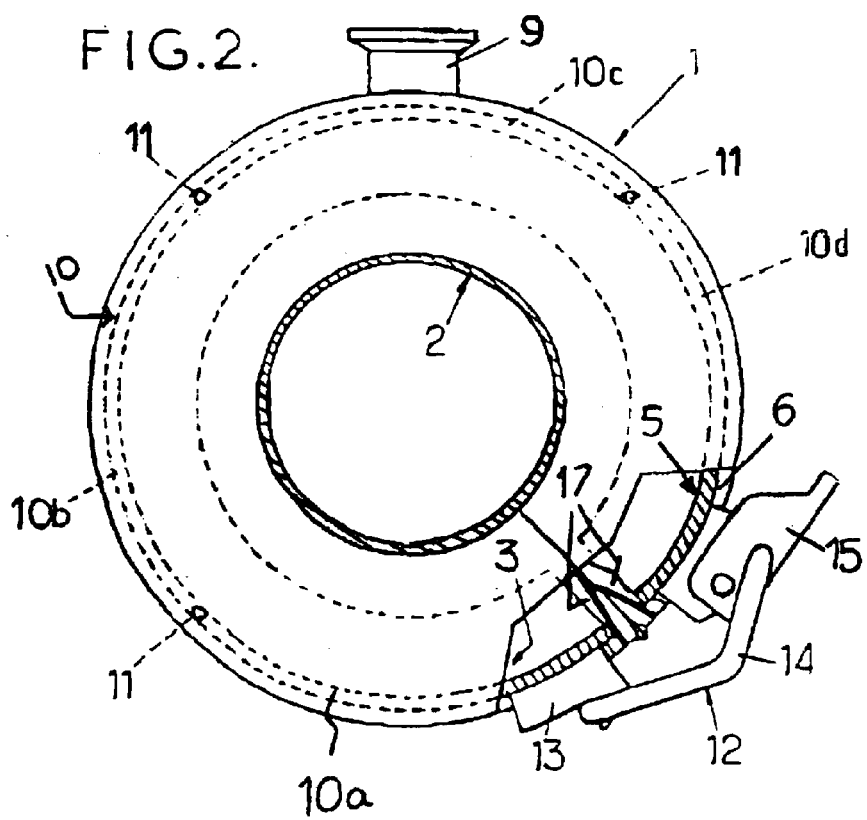

The invention will be better understood from reading the detailed description which follows of one preferred embodiment which is given merely by way of nonlimiting example. In this description, reference is made to the appended drawing in which:

FIG. 1 is a side view, in diametral section, of a test device according to the invention, shown in the mounted position; and FIG. 2 is an end-on view, with partial cutaway, of the device of FIG. 1.

Referring to FIGS. 1 and 2, the leak test device, denoted in its entirety by the numerical reference 1, has the overall shape of a clamp capable, in the mounted position which is illustrated, of sealingly enclosing all or part of a chamber 2 so as to define, around this chamber, a sniffing enclosure 3.

In the example illustrated, the chamber 2 consists of a tubular portion formed of the adjacent ends of two tubes 4a, 4b, which ends are connected (for example by welding or by any other means) in a sealed manner. In the scenario specifically depicted, the two tubes 4a, 4b have different diameters and are of circular shape.

The test device 1 consists of the combination of a rigid bearing framework 5 and of a sealing jacket 6 supported by this framework.

The rigid bearing framework 5 consists of a metal structure 10 in the general form of an annular trough (in the mounted position), with a cross section in the overall shape of a U open radially toward the inside. This annular trough structure 10 has a bottom 7 flanked laterally by two returned and inclined legs 8. A flange 9 is provided on this structure to allow a pumping machine to be connected.

As can be seen better in FIG. 2, the annular trough metal structure 10 is formed by the combination of several sections 10a, 10b, ... arranged one after the other and hinged together in terms of rotation by articulations 11, this allowing the clamp to be opened up when it is being put on the chamber 2 or removed therefrom.

In the example depicted in FIG. 2, the annular trough metal structure 10 consists of four sections 10a to 10d connected by three articulations $11_1$ to $11_3$ which are arranged with angular offsets of about 90° from each other. It would seem that such an arrangement ought to cover a great range of requirements. However, other arrangements are just as conceivable, with different angular offsets of the articulations 11 and/or with a greater number of sections 10 so as to make fitting on chambers of special shapes and/or on tubes of very large diameter, easier.

The bearing framework thus constructed is rigid (metal, particularly aluminum alloy, polymer, composite).

To allow the device to be immobilized around the chamber 2 when it is mounted, when the vacuum has not yet been pulled in the sniffing chamber 3, provision is made for the framework 5 to be equipped with locking means 12 capable of connecting together the two free this structure around the chamber. Said locking means 12 may, for example, be of the type comprising a hook 13 mounted on one of the sections (10a) and a loop 14 mounted so that it can rotate on a toggle lever 15 fixed to the section (10d) opposite.

The jacket 6 is made of a relatively flexible material supported by the aforementioned framework 5 (for example, the framework is overmolded with the jacket material). This jacket extends continuously along the entire length of the framework and extends laterally over the legs 8. At the curved free edges of the legs 8 (edges of the trough), the material is shaped into sealing lips 16 which are deformable and able to press sealingly against the surface of the chamber.

The hardness of the material of which the jacket is made has to be chosen with care, because it is essentially this that determines the perfectness of the seal and the performance of the device. If the material is too flexible, there is a risk that the lips will be made to deform too much under the action of the strong vacuum pulled in the sniffing chamber, and ultimately there is a risk that such fatigue will lead to breakage. Conversely, too high a hardness would prevent the lips from having the flexibility they need to press perfectly against the surface of the chamber, and to hug the slightest variations therein. To reconcile these contradictory requirements as far as possible, it would seem that the material of which the jacket is made needs to have a Shore hardness of about 40.

The jacket may be made of any appropriate material, particularly a plastic. Good results have been obtained with polyurethane, silicone and polyprene, but others may be just as suitable. One imperative is that the material must not, in the presence of a vacuum, create immediate release of gas which would disrupt the results of the leak test It will also be noted that, as visible in FIG. 2, the jacket 6 covers, at 17, the face-to-face ends of the two end sections 10a and 10d of the framework 5 so as to seal their meeting point.

A device arranged according to the invention proves to be particularly advantageous because of the simplicity of its arrangement and of its handling. Furthermore, although the jacket is secured to the framework, it may, however, be detached (demolded) therefrom when necessary (material damaged, absorption of tracing gas leading to disruptive measurements, etc.). The framework can then be kept and overmolded again, appreciably reducing the cost of operation of the device.

The tests carried out with this device showed that it was able to measure leak rates in the range from $10^{-9}$ [mbar.l.s$^{-1}$], and was quick and simple to use.

Such a device has been more particularly designed for checking the tightness of the magnetic junction lines in the LHC collider at CERN.

However, its field of application is far broader and it may find a use in highly diverse fields.

Specifically, this device needs to be able to allow any installation used for transporting dangerous or very clean fluids (liquids or gases) to be leak tested prior to its entry into service. Medical, chemical, pharmaceutical, agro-foodstuffs, electronics and cryogenic production laboratory installations, and those in the field of petrochemicals and space require nozzle installations which need to guarantee a very good level of sealing. A leak test carried out using a conventional method takes a long time to prepare. The time saved by implementing the device of the invention, over a conventional test, is of the order of 1 to 3 hours depending on the application, and this is merely when there are no leaks. When there is a leak, it is often very difficult to pinpoint it when a collection of tubes is being tested; isolation pocket systems are produced to isolate each junction, then the tracer gas is sent into these in order to determine the origin of the leak. The reliability of such a method is limited by the tightness of the pockets themselves (generally $10^{-7}$ [mbar.l.s$^{-1}$]), which may allow the gases to escape and contaminate the other junctions. It is then necessary to make sure that each junction is isolated, and the intervention time becomes very long (ranging from a few hours to a few days).

The device of the invention eliminates these handling operations because it allows each junction to be isolated reliably and guarantees immediate location of any leak there might be.

It is also possible to envision temporary repairs to leaks using this device. For example, if a leak occurs in a particle accelerator during operation, there are no means of repairing this leak without shutting the machine down, something which often has very serious consequences. The device of the invention allows a temporary repair to be effected in this case: all that is actually required is for the device to be placed around the leak and for the shell to be pumped out dynamically or by closing the inlet valve (static vacuum) so as to temporarily maintain an acceptable level of vacuum until there is a programmed shutdown of the accelerator when the permanent repair can be carried out.

What is claimed is:

1. A device for leak testing a chamber, which is shaped as an openable clamp capable, in the functional position, of sealingly enclosing all or part of the chamber so as to define, around the latter, a sniffing enclosure comprising:

a rigid bearing framework made up of several sections articulated together to allow the clamp to be opened up while the chamber is being placed internal to the framework or removed therefrom, said framework being shaped in the form of a trough with, in cross section, the overall shape of a U open radially toward the inside; and a sealing jacket made of relatively flexible material positioned at least partially external to the framework, supported by said framework and shaped, at the edges of the trough formed by the framework, into deformable sealing lips able to press sealingly against the surface of the chamber.

2. The device as claimed in claim 1, wherein the rigid bearing framework is made of metal.

3. The device as claimed in claim 1, wherein the rigid bearing framework includes four sections connected one after the other by three articulations which are offset by about 90° from each other.

4. The device as claimed in claim 1, further comprising:

locking means for keeping the clamp in the sealed closed position around the chamber that is to be tested.

5. The device as claimed in claim 1, wherein the relatively flexible material of which the jacket is made has a Shore hardness of about 40.

6. The device as claimed in claim 1, wherein the jacket is a plastic material which externally overmolds the rigid framework.

7. The device as claimed in claim 1, wherein the sealing lips project beyond the respective edges of the rigid trough and are widened to define a relatively broad face for bearing on the surface of the chamber.

8. The device as claimed in claim 2, wherein the metal is aluminum.

9. A device for leak testing a chamber which is shaped as an openable clamp capable, in the functional position, of sealingly enclosing all or part of the chamber so as to define, around the latter, a sniffing enclosure comprising:

a rigid bearing framework made up of several sections articulated together to allow the clamp to be opened up while it is being placed on the chamber or removed therefrom, said framework being shaped in the form of a trough with, in cross section, the overall shape of a U open radially toward the inside, the rigid bearing framework including four sections connected one after the other by three articulations which are offset by about 90° from each other; and a sealing jacket made of relatively flexible material, supported by said framework and shaped, at the edges of the trough formed by the framework, into deformable sealing lips able to press sealingly against the surface of the chamber.

10. An apparatus for leak testing comprising:

a rigid framework having at least three articulated sections connected to one another for surrounding at least one conduit positioned internal; and at least one sealing jacket formed at least partially external to the rigid framework and shaped, at the edges of the trough formed by the framework, into deformable sealing lips adapted to be pressed sealingly against an external surface of said at least one conduit.

11. The apparatus of claim 10, further comprising:

a port formed in the rigid framework for permitting a vacuum pump to connect thereto.

12. The apparatus of claim 10, wherein the sealing jacket is operable for withstanding a strong vacuum such that a leak detector can detect a leak at the limit of the sensitivity of the detector of approximately $10^{-9}$ mbar·l·s$^{-1}$.

13. The apparatus of claim 10, wherein the rigid framework is made of metal.

14. The apparatus of claim 10, wherein the rigid framework is made of aluminum.

15. The apparatus of claim 10, wherein the rigid bearing framework includes four sections connected one after the other by three articulations which are offset by about 90° from each other.

16. The apparatus of claim 10, further comprising:

locking means for keeping the clamp in the sealed closed position around the chamber that is to be tested.

17. The apparatus of claim 16, wherein the locking means comprises:

a bracket having a hook connected to one of articulated sections;

a toggle lever connected to an adjacent articulated section, the lever having a loop for securing with the hook when the lever is depressed.

18. The apparatus of claim 10, wherein the flexible material of which the jacket is made has a Shore hardness of about 40.

19. The apparatus of claim 10, wherein the jacket is made of a plastic material which externally overmolds the rigid framework.

20. The apparatus of claim 10, wherein the sealing lips project beyond the respective edges of the rigid trough and are widened to define a relatively broad face for bearing on the surface of the chamber.

* * * * *